(No Model.)

D. McKENZIE.
FLOUR SIFTER.

No. 519,003.

Patented May 1, 1894.

WITNESSES
R. F. Lagantle.
Henry Elenger

INVENTOR
Donald McKenzie
BY
B. F. Eibler
Attorney

UNITED STATES PATENT OFFICE.

DONALD McKENZIE, OF CLEVELAND, OHIO.

FLOUR-SIFTER.

SPECIFICATION forming part of Letters Patent No. 519,003, dated May 1, 1894.

Application filed October 19, 1893. Serial No. 488,615. (No model.)

*To all whom it may concern:*

Be it known that I, DONALD MCKENZIE, a citizen of the United States, residing at Cleveland, in the county of Cuyahoga and State of Ohio, have invented a new and Improved Flour-Sifter; and I do hereby declare that the following is a full, true, and exact description thereof.

My invention relates to an improved flour sifter of the class which are carried and manipulated by the use of one hand only.

The object of my improvement is to combine simplicity and convenience with a device expedient and unique in operation.

That the invention may be fully understood and seen reference is had to the following specification and the accompanying drawings, in which—

Figure 1:
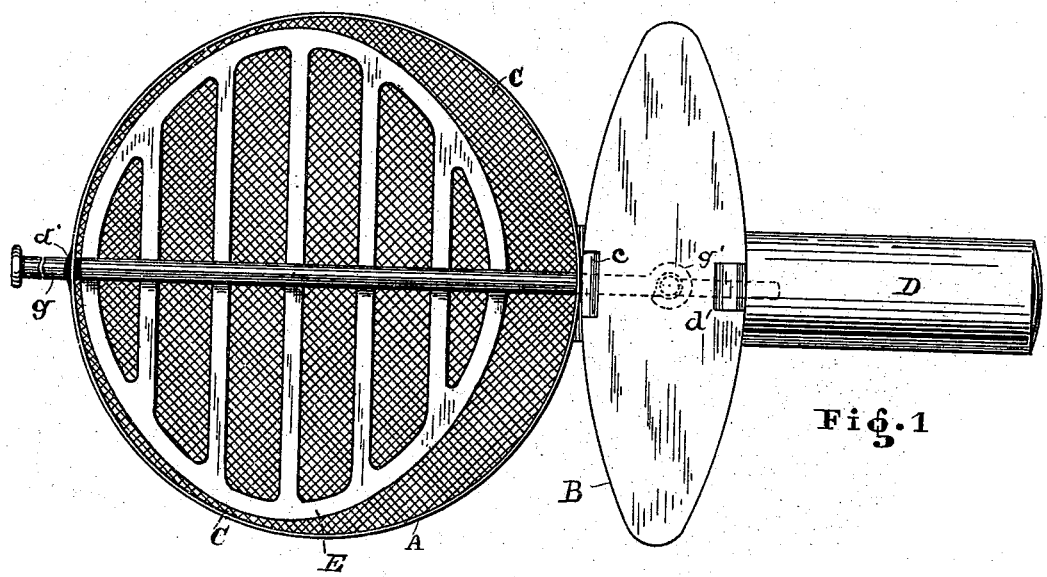
Figure 2:
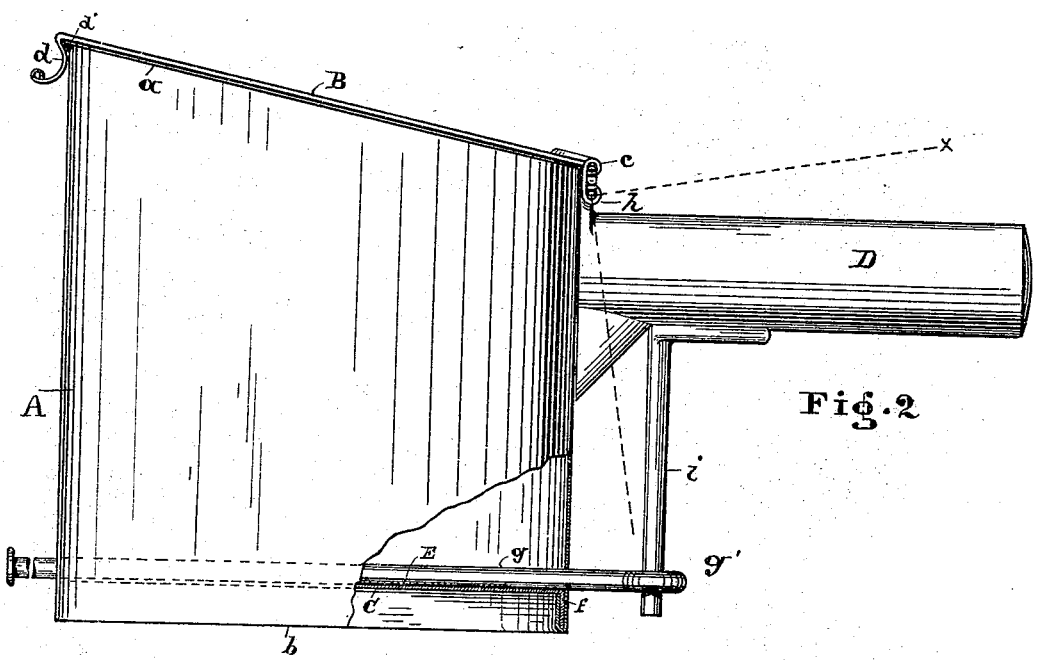

Figure 1 represents a plan view of said sifter, and Fig. 2 is a part side and part sectional view of the same.

Like letters of reference denote like parts in the drawings and specification.

The flour sifter above referred to substantially consists of the following parts viz: the bucket A with cover B and screen bottom C, the handle D and sweeper or agitator E. The bucket A is preferably cylindrical in form, the upper side $a$ being oblique, while the lower side $b$ is straight or square. The cover B is hinged at $c$ and provided with a tension latch $d$ to engage over the tip $d'$ of the bucket A see Figs. 1 and 2. The purpose of the side $a$ being oblique is to facilitate the filling of said bucket or sifter proper. The screen C comprises the bottom of said bucket and is held secure in the manner as shown at $f$ Fig. 2. Placed in close proximity to said screen is the sweeper E, the latter is attached to the rod $g$ which extends transversely over and through the bucket A as seen in Figs. 1 and 2. The handle D, which is hinged at $h$ may be of any suitable form or material, and has depending from the under side thereof the arm $i$, which engages the eyelet $g'$ of the rod $g$. The connection of said arm and rod however may be attained in different manner or means without departing from the nature of my invention. The *modus operandi* of the above said sifter is as effectual as unique. The bucket being filled and the cover fastened, it is a simple forward and downward exertion of the hand or arm or movement of the wrist only which accomplishes a tossing of the bucket, that is exercising the wrist in vertical direction causes the bucket to swing upon its horizontal hinge, and quickly repeated motions will result in rebounding effects of the handle upon said bucket; the screen bottom thereby vibrates under the sweeper E, which causes an agitation of the flour as the sweeper is restrained from following the movements of the bucket owing to the connection of the arm and rod see Fig. 2.

The dotted line X indicates the extent to which the handle can be withdrawn or tilted for the commoter to slide over the entire face of the screen, and comparatively but few exertions in about the manner as above referred to suffice to empty the bucket of the contents to be sifted through the screen C.

What I claim, and desire to secure by Letters Patent, is—

1. In a flour sifter the handle having a horizontal hinge in common with the upper rear side of the bucket part thereof, to admit of tossing said bucket by said handle, and the depending arm of said handle in engagement with the eye of the guide rod of the sweeper constructed and arranged substantially as shown and for the purpose described.

2. In a flour sifter the combination with the bucket, screen and sweeper thereof, of a handle having a horizontally arranged, hinged connection with and near the rear top edge of said bucket, and an arm depending from said handle for connection with the rod of the sweeper, to restrain said sweeper when the hinged bucket is tossed by said handle, constructed and arranged substantially as and for the purpose set forth.

In testimony whereof I hereunto set my hand in presence of two witnesses.

DONALD McKENZIE.

Witnesses:
B. F. EIBLER,
WILL G. GUENTHER.